(12) United States Patent
Zeger et al.

(10) Patent No.: US 9,025,607 B2
(45) Date of Patent: May 5, 2015

(54) METHOD AND APPARATUS FOR EFFICIENT TRANSMISSION OF INFORMATION TO MULTIPLE NODES

(71) Applicant: Massachusetts Institute of Technology, Cambridge, MA (US)

(72) Inventors: Linda M. Zeger, Lexington, MA (US); Muriel Medard, Belmont, MA (US); Amanda Peters, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 118 days.

(21) Appl. No.: 13/668,758

(22) Filed: Nov. 5, 2012

(65) Prior Publication Data

US 2013/0114611 A1    May 9, 2013

Related U.S. Application Data

(60) Provisional application No. 61/556,204, filed on Nov. 5, 2011.

(51) Int. Cl.
*H04L 12/701* (2013.01)
*H04L 12/18* (2006.01)
*H04L 1/18* (2006.01)
*H04L 1/00* (2006.01)

(52) U.S. Cl.
CPC ......... *H04L 45/00* (2013.01); *H04L 2001/0093* (2013.01); *H04L 12/1868* (2013.01); *H04L 1/0077* (2013.01); *H04L 1/1829* (2013.01)

(58) Field of Classification Search
CPC ................ H04L 1/0077; H04L 1/0057; H04L 2001/0093

USPC ......... 370/229, 235, 236, 282, 310, 315, 328, 370/338, 389, 400, 408, 410
See application file for complete search history.

(56) References Cited

U.S. PATENT DOCUMENTS

| | | | |
|---|---|---|---|
| 5,577,056 A | 11/1996 | Malik et al. |
| 6,128,773 A | 10/2000 | Snider |
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

PCT Search Report of the ISA for PCT/US2012/063537 dated Mar. 8, 2013.

(Continued)

*Primary Examiner* — Curtis A Alia
(74) *Attorney, Agent, or Firm* — Daly, Crowley, Mofford & Durkee, LLP

(57) ABSTRACT

A system and method to reduce the number of data transmissions between nodes in a network is described. In one embodiment, a system and method for reducing the amount of ACK and NAK traffic in a network is described.

5 Claims, 8 Drawing Sheets

(56) References Cited

U.S. PATENT DOCUMENTS

| | | |
|---|---|---|
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1* | 11/2005 | Ramesh et al. ............... 714/748 |
| 2006/0020560 A1 | 1/2006 | Rodriguez et al. |
| 2006/0146791 A1 | 7/2006 | Deb et al. |
| 2006/0224760 A1 | 10/2006 | Yu et al. |
| 2007/0046686 A1 | 3/2007 | Keller |
| 2007/0116027 A1 | 5/2007 | Ciavaglia et al. |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285145 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1 | 1/2010 | Jiang |
| 2010/0046371 A1 | 2/2010 | Sundararajan et al. |
| 2010/0054164 A1* | 3/2010 | Lucani et al. ............... 370/294 |
| 2010/0111165 A1 | 5/2010 | Kim et al. |
| 2010/0146357 A1 | 6/2010 | Larsson |
| 2011/0173517 A1* | 7/2011 | Kim ............................ 714/776 |
| 2011/0238855 A1 | 9/2011 | Korsunsky et al. |
| 2012/0057636 A1 | 3/2012 | Tian et al. |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 | 4/2011 |
| WO | WO 2011/043754 A1 | 4/2011 |
| WO | WO 2011043754 A1 * | 4/2011 |
| WO | WO 2011/119009 A1 | 9/2011 |
| WO | WO 2011/119009 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

Written Opinion of the ISA for PCT/US2012/063537 dated Mar. 8, 2013.

PCT International Preliminary Report on Patentability for PCT/US2012/063537 dated May 15, 2014.

Baron, et al.; "Coding Schemes for Multislot Messages in Multichannel ALOHA With Deadlines;" IEEE Transactions on Wireless Communications; vol. 1; No. 2; Apr. 2002; pp. 292-301.

Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.

Lucani, et al.; "Network Coding Schemes for Underwater Networks;" WUWNet 07; Sep. 14, 2007; pp. 25-32.

Rezaee, et al.; "Speeding Multicast by Acknowledgement Reduction Technique (SMART);" ArXiv:1104.2941v2 [cs.NI] Sep. 10, 2011; 6 pages.

Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.

Zeger; "Packet Erasure Coding with Random Access to Reduce Losses of Delay Sensitive Multislot Messages;" IEEE; Paper ID #900482; Aug. 18, 2009; pp. 1-8.

"Data Service Options for Spread Spectrum Systems: Radio Link Protocol Type 3;" 3GPP2 C.S0017-010-A; Version 2.0; Sep. 2005.

"Guest Editorial Wireless Video Transmission;" IEEE Journal on Selected Areas in Communications; vol. 28; No. 3; Apr. 2010; pp. 297-298.

Abichar, et al.; "WiMax vs. LTE: Who Will Lead the Broadband Mobile Internet?;" Mobile Computing; IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed Network Storage?;" Proc. $1^{st}$ Workshop on Network Coding, Theory, and Applications (Netcod'05); Apr. 2005; 6 pages.

Adamson, et al.; "Multcast Negative-Acknowledgment (NACK) Building Blocks;" Internet Engineering Task Force (IETF),RFC; vol. 5401; Nov. 2008; 42 pages.

Adamson, et al.; "NACK-Oriented Reliable (NORM) Transport Protocol;" Internet Engineering Task Force (IETF); RFC; vol. 5740; Nov. 2009; 94 pages.

Adamson, et al.; "Quantitative Prediction of NACK-Oriented Reliable Multicast (NORM) Feedback;" Proceedings, MILCOM 2000; vol. 2; Oct. 2002; 6 pages.

Ahlswede, et al.; "Network Information Flow;" IEEE Transactions on Information Theory; vol. 46; No. 4; Jul. 2000; pp. 1204-1216.

Ahmed, et al.; "On the Scaling Law of Network Coding Gains in Wireless Networks;" IEEE; MILCOM 2007; Oct. 2007; 7 pages.

(56) References Cited

OTHER PUBLICATIONS

Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communication Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhardra, et al.; "Looking at Large Networks: Coding vs. Queuing;" Proc. of the $25^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithims for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proceedings of the $41^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5778v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.
Deb, et al.; "On Random Network Coding Based Information Dissemination;" Proc. of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed- and Variable-Rate Multiresolution Source Codes; IEEE Transactions on Information Theory; vol. 45, No. 6; Sep. 1999; pp. 1887-1910.

(56) References Cited

OTHER PUBLICATIONS

Effros; "Universal Multiresolution Source Codes;" IEEE Transactions on Information Theory; vol. 47; No. 6; Sep. 2001; pp. 2113-2129.

El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.

Eryilmaz, et al.; On Delay Performance Gains From Network Coding; Information Sciences and Systems; 2006 40th Annual Conference on Mar. 22-24, 2006; 7 pages.

Fan, et al., "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling;" Communication, Control, and Computing; 2010; 48th Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" 47th Annual Allerton Conference, IEEE; Sep. 30, 2009; pp. 447-454.

Feizi, et al; "Cases Where Finding a Minimum Entropy Coloring of a Characteristic Graph is a Polynomial Time Problem;" IEEE International Symposium on Information Theory; Jun. 13, 2010; pp. 116-120.

Ferner, et al.; "Toward Sustainable Networking: Storage Area Networks with Network Coding;" Fiftieth Annual Allerton Conference; IEEE; Oct. 1-5, 2012; pp. 517-524.

Ford; "Architectural Guidelines for Multipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges;" MILCOM; Oct. 2007; 8 pages.

Frossard, et al.; "Media Streaming With Network Diversity;" Invited Paper; Proceedings of the IEEE; vol. 96, No. 1; Jan. 2008; pp. 39-53.

Galbraith, et al.; (HGST); "Iterative Detection Read Channel Technology in Hard Disk Drives;" Whitepaper; Nov. 2008; 8 pages.

Garcia-Luna-Aceves; "Challenges: Towards Truly Scalable Ad Hoc Networks;" MobiCom 2007; Sep. 2007; pp. 207-214.

Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.

Ghaderi, et al.; Reliability Gain of Network Coding in Lossy Wireless Networks; Infocom 2008; The 27th Conference on Computer Communications IEEE; Apr. 13-18, 2008; 5 pages.

Gheorghiu, et al.; "Multipath TCP with Network Coding for Wireless Mesh Networks;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Ghez, et al.; "Stability Properties of Slotted Aloha with Multipacket Reception Capability;" IEEE Transactions on Automatic Control; vol. 33; No. 7; Jul. 1988; pp. 640-649.

Gkantsidis, et al.; "Cooperative Security for Network Coding File Distribution;" Proc. IEEE Infocom; Apr. 2006; 13 pages.

Gollakota, et al.; "ZigZag Decoding: Combating Hidden Terminals in Wireless Networks;" SIGCOMM 08; Aug. 17-22; pp. 159-170.

Golrezaei, et al.; "FemtoCaching: Wireless Video Content Delivery Through Distributed Caching Helpers;" arXiv:1109.4179v2; Apr. 7, 2012; pp. 1-11.

Grant, et al.; "Graph Implementation for Nonsmooth Convex Programs;" LNCIS 371; Springer-Verlag Limited; Jan. 2008; pp. 95-110.

Gupta; "The Capacity of Wireless Networks;" IEEE Transactions on Information Theory; vol. 46; No. 2; Mar. 2000; pp. 388-404.

Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. of the 43rd Symposium on Theory of Computing (STOC); Jan. 2011, 13 pages.

Haeupler, et al.; "Optimality of Network Coding in Packet Networks;" ArXiv, Feb. 17, 2011; 5 pages.

Haley, et. al.; "Reversible Low-Density Parity-Check Codes;" IEEE Transactions on Information Theory; vol. 55; No. 5; May 2009; pp. 2016-2036.

Halloush, et al.; "Network Coding with Multi-Generation Mixing: Analysis and Applications for Video Communication;" IEEE International Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Nework Coding for Security;" IEEE Military Communications Conference; Oct. 2007; pp. 1-6.

Hassner, et al.; "4K Bye-Sector HDD-Data Format Standard;" Windows Hardware and Driver Central; San Jose, CA; Aug. 14, 2013; 5 pages.

Ho, et al.; "A Random Linear Network Coding Approach to Multicast;" IEEE Transactions on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of 41st Annual Allerton Conference on Communications, Control and Computing; Oct. 2003; 10 pages.

Ho, et al.; "On the utility of network coding in dynamic environments;" International Workshop on Wireless Ad-Hoc Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6.

Ho, et al.; "The Benefits of Coding over Routing in a Randomized Setting;" IEEE; ISIT Jun. 29-Jul. 4, 2003; p. 442.

Hofri; "Disk Scheduling: FCFS vs. SSTF Revisited;" Communications of the ACM; vol. 23; No. 11; Nov. 1980; pp. 645-653.

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

Jaggi, et al.; "Resilient Network Coding in the Presence of Byzantine Adversaries;" Proc. IEEE INFOCOM; May 2007; 9 pages.

Jakubczak, et al.; "One-Size-Fits-All Wireless Video;" ACM SigComm Hotnets 2009; 6 pages.

Jamieson, et al.; "PPR: Partial Packet Recovery for Wireless Networks;" SIGCOMM 07; Aug. 27-31, 2007; 12 pages.

(56) References Cited

OTHER PUBLICATIONS

Jamieson, et al.; "PPR: Partial Packet Recovery for Wireless Networks;" Presentation; SIGCOMM 07: Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in The Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et. al.; "Modeling Network Coded TCP Throughput: A Simple Model and its Validation", arXiv: 1008.0420v1 [cs.IT] Aug. 2, 2010; 9 pages.
Kim, et. al.; "Modeling Network Coded TCP Throughput: A Simple Model and its Validation", Nov. 2010, Presentation; 19 pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;" Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{nd}$ Symposium on Theory of Computing (STOC); Jun. 5-8, 2010; 10 pages.
Lai; "Sequential Analysis: Some Classical Problems and New Challenges"; Statistics Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006—Spring); IEEE $63^{rd}$; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland; Conference: NetCod 2009, Lausanne, Switzerland; Jun. 2009; 6 pages.
Lucani et al; "On Coding for Delay—New Approaches Based on Network Coding in Networks with large Latency;" Conference: ITA Workshop, San Diego, USA; Feb. 2009; 10 pages.
Lucani et al; "On Coding for Delay New Approaches based on Network Coding in Networks with Large Latency;" Conference ITA Workshop, San Diego, USA; Slide Presentation; Feb. 13, 2009; 11 pages.

(56) References Cited

OTHER PUBLICATIONS

Lucani et al; "Random Linear Network Coding for Time Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding for Data Dissemination: It is Not What You Know, But What Your Neighbors Don't Know;" Modeling and Optimization in Mobile, AdHoc, and Wireless Networks 2009; WIOPT 2009; $7^{th}$ International Symposium on Jun. 23-27, 2009; pp. 1-8.
Lucani, et al.; "Network Coding Schemes for Underwater Networks;" WUWNet 07; Sep. 14, 2008; pp. 25-32.
Lucani, et al.; "Systematic Network Coding for Time-Division Duplexing;" Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; "An Analysis of Finite-Memory Random Linear Coding on Packet Streams;" Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. of the $44^{th}$ Allerton Conference on Communication, Control, and Computing; Sep. 2006; 10 pages.
Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 367-373.
Metzner; "An Improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.
Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008.
ParandehGheibi, et al.; "Access-Network Association Policies for Media Streaming in Heterogeneous Environments;" Apr. 2010; pp. 1-8.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popovici, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.
Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Rezaee, et al., "Multi Packet Reception and Network Coding;" Presentation at The 2010 Military Communications Conference Unclassified Technical Program; Nov. 2, 2010; 15 pages.
Rezaee, et al.; "An Analysis of Speeding Multicast by Acknowledgement Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.
Rezaee, et al.; "Speeding Multicast by Acknowledgment Reduction Technique (SMART);" ArXiv:1104.2941v2 [cs.NI] Sep. 10, 2011; 6 pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Rezaee, et al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al., "Polynomial Time Algorithms for Network Information Flow;" $15^{th}$ ACM Symposium on Parallel Algorithms and Architectures; Jun. 2003; pp. 1-9.

(56) References Cited

OTHER PUBLICATIONS

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-sp-04;" Internet Engineering Task Force; Internet-Draft; Nov. 22, 2010; 26 pages.

Seferoglu, et al.; "Opportunistic Network Coding for Video Streaming over Wireless;" Packet Video; Nov. 2007; 10 pages.

Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.

Servetto, et al.; "Constrained Random Walks on Random Graphs; Routing Algorithms for Large Scale Wireless Sensor Networks;" WSNA 02; Sep. 28, 2002; 10 pages.

Shenker, et al.; "Pricing in computer networks; reshaping the research agenda;" Telecommunications Policy; vol. 20, No. 3; Jan. 1996; pp. 183-201.

Sherali, et al.; "Recovery of primal solutions when using subgradient optimization methods to solve Lagrangian duals of linear programs;" Elsevier Operations Research Letters 19 (Jan. 1996); pp. 105-113.

Shields; "The Interactions Between Ergodic Theory and Information Theory;" IEEE Transactions on Information Theory, vol. 44, No. 6; Oct. 1998; pp. 2079-2093.

Shrader, et al.; "Systematic wireless network coding;" Military Conference, 2009; MILCOM 2009; IEEE; 7 pages.

Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.

Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al., "Performance analysis of joint chase combining and network coding in wireless broadcast retransmission;" Wireless Communication, Network and Mobile Computing 2008; WiCOM '08, 4th International Conference on Oct. 12-14, 2008; pp. 1-4.

Soo Suh; "Send-On-Delta Sensor Data Transmission With a Linear Predictor;" Sensors; ISSN 1424-8220; vol. 7; No. 4; Apr. 26, 2007; pp. 537-547.

Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.

Sundaram, et al.; "Multirate Media Streaming Using Network Coding;" Proc. 43rd Allerton Conference on Communication, Control, and Computing; Sep. 2005; 7 pages.

Sundararajan, et al.; "ARQ for Network Coding;" ISIT Proc. of the IEEE International Symposium on Information Theory (ISIT); Jul. 6-11, 2008; pp. 1651-1655.

Sundararajan, et al.; "Network Coding Meets TCP: Theory and Implementation;" Proceedings of the IEEE; vol. 99, Issue 3; Mar. 2011; pp. 490-512.

Sundararajan, et al.; "Network coding meets TCP;" InfoCOM 2009; IEEE, Apr. 19-25, 2009; pp. 280-288.

Sundararajan, et al.; "On Queueing in Coded Networks—Queue Size Follows Degrees of Freedom;" IEEE Information Theory Workshop on Information Theory for Wireless Networks (ITW); Jul. 1-6, 2007; 6 pages.

Teerapittayanon, et al.; "Network Coding as a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generation Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; 7th International ITG Conference on Jan. 14-16, 2008; 6 pages.

Tosun, et al.; "Efficient Multi-Layer Coding and Encryption of MPEG Video Streams;" Proc. 2000 IEEE International Conference on Multimedia and Expo; vol. 1; 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 685-698.

Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.

Trung, et al.; "Quality Enhancements for Motion JPEG Using Temporal Redundancies;" IEEE Transactions on Circuits and System for Video Technology, vol. 18; No. 5; May 2008; pp. 609-619.

Tsatsanis, et al.; "Network Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

Velambi, et al.; "Throughput and Latency in Finite-Buffer Line Networks;" IEEE Transactions on Information Theory; vol. 57; No. 6; Jun. 2011; pp. 3622-3643.

Vien, al., "Network Coding-based Block ACK for Wireless Relay Networks;" Proceedings of IEEE Vehicular Technology Conference (VTC2011—Spring); May 2011; 5 pages.

Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 4 pages.

Vilela, et al.; "Lightweight Security for Network Coding;" IEEE International Conference on Communications; May 2008; 5 pages.

Wang, et al.; "Capacity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Multiple Packet Reception;" in INFOCOM 2008; The 27th Conference on Computer Communications; IEEE; Apr. 2008; pp. 1517-1525.

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.

Widmer, et al.; "Network Coding for Efficient Communication in Extreme Networks;" Applications, Technologies, Architectures, and Protocols for Computer Communication; Aug. 2005; pp. 284-291.

Wieselthier, et al.; "Energy Efficient Broadcast and Multicast Trees in Wireless Networks;" Mobile Networks and Applications 7; Jan. 2002; pp. 481-492.

Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.

Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2006; pp. 768-772.

Yazdi, et al.; "Optimum Network Coding for Delay Sensitive Applications in WiMAX Unicast;" IEEE INFOCOM 2009; Apr. 19-25, 2009; pp. 1576-2580.

(56) References Cited

OTHER PUBLICATIONS

Yeung; "Multilevel Diversity Coding with Distortion;" IEEE Transactions on Information Theory; vol. 41, No. 2; Mar. 1995; pp. 412-422.

Yong, et al.; "XOR Retransmission in Multicast Error Recovery;" Networks 2000; ICON; Proceedings IEEE International Conference on Sep. 5-8, 2000; pp. 336-340.

Yun, et al.; "High-Throughput Random Access Using Successive Interference Cancellation in a Tree Algorithm;" IEEE Transactions on Information Theory; vol. 53; No. 12; Dec. 2007; pp. 4628-4639.

Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.

Zhang, et al.; "Collision Resolution in Packet Radio Networks Using Rotational Invariance Techniques;" IEEE Transactions on Communication; vol. 50, No. 1; Jan. 2002; pp. 146-155.

Zhang, et al.; "Optimized Multipath Network Coding in Loss Wireless Networks;" ICDCS '08 Proceedings of the 2008 the 28th International Conference on Distributing Computing Systems; Jan. 2008; 12 pages.

Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.

Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Information Theory and Applications Workshop (ITA), Jan. 2010; pp. 1-6.

Zhu, et al.; "Multicast with Network Coding in Application-Layer Overlay Networks;" IEEE Journal on Selected Areas in Communications; vol. 22; No. 1; Jan. 2004; pp. 1-13.

U.S. Appl. No. 13/654,953, filed Oct. 18, 2012, Zeger, et al.
U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.

* cited by examiner

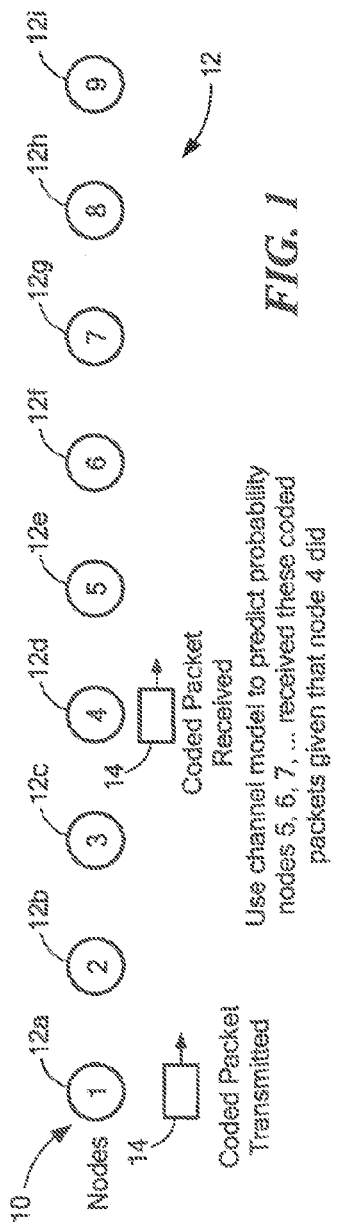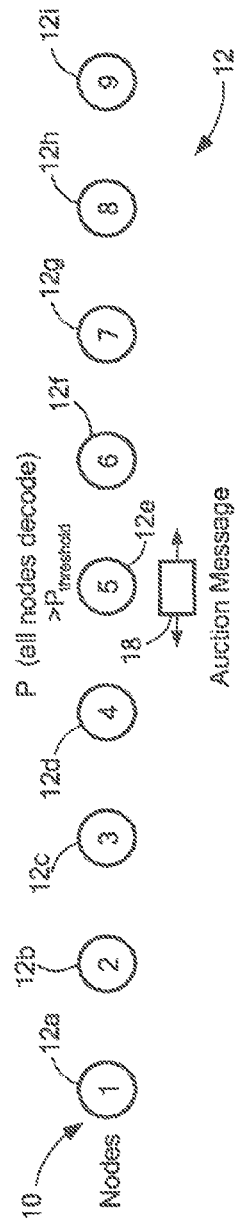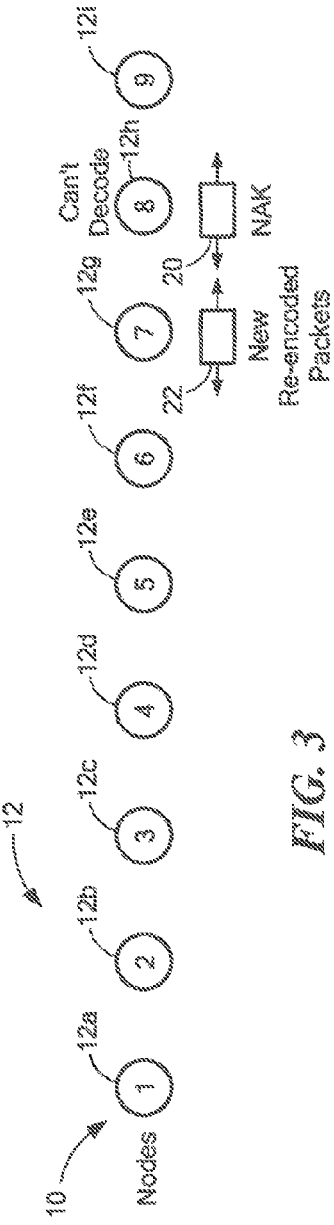

METHOD AND APPARATUS FOR EFFICIENT TRANSMISSION OF INFORMATION TO MULTIPLE NODES

CROSS REFERENCE TO RELATED APPLICATION

This application claims the benefit of U.S. Provisional Application No, 61/556,204 filed Nov. 5, 2011 under 35 U.S.C. §119(e) which application is hereby incorporated herein by reference in its entirety.

GOVERNMENT RIGHTS

This work was supported by the United States Department of the Air Force under Contract No. FA8721-05-C-0002. The Government has certain rights in this invention.

FIELD

This application generally relates to transmitting information and more particularly to efficient and reliable distribution of content (including, but not limited to video, images, or documents) among users.

BACKGROUND

In conventional communications systems acknowledgments are either performed on an end-to-end basis, such as with TCP, or else on a hop-by-hop basis, as is accomplished with link layer acknowledgements. Such acknowledgements conventionally are in the form of feedback about specific packets or groups of specific packets.

Network coding enables feedback to consist only of the number of packets received or missing, as the identity of specific individual packets is no longer needed with coding.

The problem of reliable multicast can be difficult, particularly in a mobile ad hoc network NANET). If each node must acknowledge every packet it receives, and the number of nodes in a network is large, or the number of simultaneous multicast messages transmitted is sizable, a so-called "acknowledgment explosion" (or "ACK explosion") can result.

It would be desirable to provide a system and technique for efficient transmission of information to multiple nodes in a network. In particular, it would also be desirable to provide a system and technique for efficient and reliable distribution of video or other content to users.

SUMMARY

The systems and techniques described herein relate to the concept of efficiently transmitting data in a network. The systems and techniques described herein may specifically be used to reduce the amount of traffic in a network while still enabling timely feedback and message delivery in the network. The systems and techniques described herein find application in a number of different types of multicast systems.

In accordance with one aspect of the concepts described herein, a system and method to reduce the number of data transmissions between nodes in a network, while still ensuring message delivery, is described. As described herein, the nodes may have a priori knowledge of the probability that a packet transmitted from as specified node can be correctly received by any other specified nodes. Such a priori knowledge can come from location information that the nodes receive about each other, as well as from a channel model.

In accordance with as further aspect of the concepts described herein, a system and method for reducing the amount of acknowledgement (ACK) and negative acknowledgement (NAK) traffic in a network is described.

In accordance with a further aspect of the concepts described herein, a system and method for conserving power in mobile and other devices connectable to a network is described.

In accordance with a still further aspect of the concepts described herein, a system and method for using location information in nodes coupled to a network to determine if the nodes have sufficient knowledge to perform cooperative feedback within the network is described. In one embodiment, cell phone GPS systems are used to provide location information of a network node and the location in formation is used to determine whether a node can send a cooperative feedback request.

In accordance with a still further aspect of the concepts described herein, a system and method for forming and delivering new types of messages for transmitting feedback efficiently is described.

In accordance with a still further aspect of the concepts described herein, a system and method for utilizing probabilistic knowledge on the state of a system as a means to decrease the amount of feedback needed in the system is described.

It should be appreciated that the concepts, systems and techniques described herein apply equally well to single hop and multi-hop systems.

The concepts, systems and techniques described herein provide a number of advantages including, but not limited to: (1) more efficient use of network bandwidth; (2) more efficient use of time; and (3) more efficient use of power at network nodes (e.g., longer battery life in nodes which operate on batteries such as mobile phones, tablets, or other devices). Thus, the concepts, systems and techniques described herein result in a generally more efficient use of multiple resources (including, but not limited to resources such as bandwidth, time, power) during transmission of information from a source node or source nodes to one or more other nodes.

In accordance with the concepts, systems and techniques described herein, a system and method which greatly reduces the amount of traffic used for ACKSs and NAKs, while still enabling timely feedback is described.

In some embodiments described herein, a wireless network, in which there will be packet losses is considered. Nodes in the network can "overhear" and store information that they receive with a sufficiently high signal to noise plus interference ratio. When intermediate "relay nodes" are used between a source and a destination, it is assumed that random linear network coding is used by such intermediate relay nodes to combine packets they receive from other nodes, before repromulgating the received information. When such a random linear combination is transmitted, all nodes within reception range of the relay node can thereby receive an implicit acknowledgment as to how many degrees of freedom that relay node has already received. In addition, the number of degrees of freedom received by other nodes, or from blocks from other flows of which the relay node has knowledge, can also potentially be piggybacked on to the new random linear combination. Similarly, new traffic originating at any node can potentially piggyback information pertaining to the degrees of freedom received from other blocks from other flows.

Thus, a node's view of the state of the system could in many cases be piggybacked on to periodic messages (e.g. periodic control messages), without significant additional bandwidth cost. Such periodic messages could be used by the nodes that hear them to update their own views of the state of the system. The state of the system is defined as the number of degrees of freedom each node has received from each block of original information packets from each flow. Part of a node's view of the state of the system in some cases could be given probabilistically, based upon a channel model, locations of other nodes, the transmissions heard by the node, and knowledge of the packets transmitted by the node.

When a non-source node's knowledge indicates that all destination nodes have, with high probability, received all the degrees of freedom from a block, then that node can send out a cooperative feedback request (also sometimes referred to herein as a "auction message") in order to confirm that transmissions of additional coded packets derived from that block can cease. That is, the non-source node can send an ACK or other nodes. Such an auction message could, for example, be appended to some other message (e.g. a periodic control message) the node would be sending anyway.

When a node's knowledge indicates, with high probability, that some nodes have not received all coded packets from a source, then that node can send out a cooperative feedback request corresponding to a negative acknowledgement or NAK, in one embodiment, another node responds to the auction message with a NAK only if at least one of two criteria holds: first, the node's view of the state of the aster differs from that in the auction message, which claims a block is completely received by all destinations; or second, if the node has knowledge, (i.e. the node has information stored therein or has access to information or can compute information) that a distant node may have been unable to hear the auction message and that the distant node may not have all the degrees of freedom of the block which the auction message advertises as being completely received. In this latter case, the NAK can potentially serve to inform the distant node of the auction message, which can then respond to this NAK. The node's knowledge may, for example, be based at least in part upon one or more of node location information, a probabilistic channel model and/or piggy backed information overheard.

Non-source nodes that receive a NAK can respond by transmitting random linear combinations from the needed block of packets. A node that responds to a NAK by transmitting more such coded packets is not necessarily the node that sent the auction message, but rather can be selected based upon criteria including its proximity to nodes missing degrees of freedom. Accordingly, the node that transmits the auction message does not necessarily even have to receive the NAK, as long as another suitably positioned node does. Thus, not all NAKs need to be successfully received by all nodes, including the source node.

For example, on a collision channel with capture, survival through a collision of only one NAK will suffice to enable a receiving node to know that more degrees of freedom are required before transmission of the block can cease. The number of random linear combinations that should be transmitted by a node can be determined by the probabilistic channel model, the node locations, and the number of degrees of freedom still missing at destination nodes.

In summary, the amount of traffic dedicated to feedback can be reduced through several mechanisms. First, a relay node that transmits coded combinations of packets can also thereby inform other nodes of the degrees of freedom it has already received. Secondly, acknowledgements for numbers degrees of freedom, rather than for individual packets, can be piggybacked onto several types of messages, with little, if any, overhead in many cases; these message types include periodic control messages, new blocks of information originating from a node, and coded repromulgated information being "relayed" from a node. Finally, when any node's knowledge accumulated from these various message types, as well as from the channel model and knowledge of the locations of other nodes, indicates that all destination nodes have with high probability received all degrees of freedom for a block of packets, that node can send one or more cooperative feedback request messages stating this premise.

Only if other nodes disagree with the premise, do they send NAKs. Since a cooperative feedback request is issued only after a node has knowledge that indicates all other nodes have all degrees of freedom for a block with high probability, statistically there will be few NAKs transmitted in response to such auction messages. Furthermore, a NAK need not be sent all the way back to the node that originated transmissions of the block; it only needs to reach another node that has all of the degrees of freedom from that block.

In addition to the new types of messages for transmitting feedback efficiently, also described is the use of probabilistic knowledge on the state of the system as a means to decrease the amount of feedback needed within a network.

In accordance with a still further aspect of the concepts described herein, in systems in which nodes have knowledge of each others' locations (e.g. such as in applications utilized by smart phones), this type of knowledge is leveraged in an efficient feedback protocol as described herein.

In accordance with a still further aspect of the concepts described herein a system and method to reduce the number of data transmissions between nodes in a network comprises a plurality of nodes, each for the nodes capable of sending an ACK or a NAK for at least one other node in the network.

In accordance with a still further aspect of the concepts described herein a system and method for reducing the amount of ACK and NAK traffic in a network comprises a plurality of nodes, each for the nodes capable of sending an ACK or a NAK for at least one other node in the network and wherein each of the nodes broadcasts its ACK or NAK.

In accordance with a still further aspect of the concepts described herein is a system and method for conserving power in mobile and other devices connectable to a network wherein each, of the mobile devices conserves battery power as a result of: (a) transmitting fewer ACK and/or NAK messages; (h) sending additional coded packets over paths that require less power (such as shorter distances); (c) sending fewer total coded packets.

In accordance with a still further aspect of the concepts described herein, a system and method for using location information in nodes to determine with high probability if nodes have sufficient numbers of coded packets. This information is used to determine when to generate cooperative feedback requests, as well as when/whether to generate cooperative ACKs or NAKs. In one application at least one node in the network corresponds to a mobile phone containing a GPS system which is used to provide the location information.

In accordance with a still further aspect of the concepts described herein, a system and method utilizing probabilistic knowledge on the state of the system as a means to decrease the amount of feedback needed in a system comprises a network having a plurality of nodes wherein each of the nodes in the network knows the location of at least one other node and each node may have a statistical model for channel losses to other nodes and wherein each of the nodes also blows what it transmitted and what it received. In one embodiment, the location of other nodes, the statistical model for channel losses to all other nodes, the node transmission and reception information are used to reduce the number of messages which are transmitted in the network, including but not limited to ACK messages and NAK messages. In one embodiment, network coding in conjunction with probabilistic reception models is used to reduce the number of repetitive transmissions to different nodes, the number of re-transmitted messages and the number of feedback messages.

BRIEF DESCRIPTION OF THE DRAWINGS

The foregoing features of this invention, as well as the invention itself, may be more fully understood from the following description of the drawings in which:

FIGS. 1-3 are a series of block diagrams illustrating a network which utilizes one or more cooperative feedback requests to reduce the amount of traffic in a network;

DETAILED DESCRIPTION OF THE PREFERRED EMBODIMENTS

Figure 4:
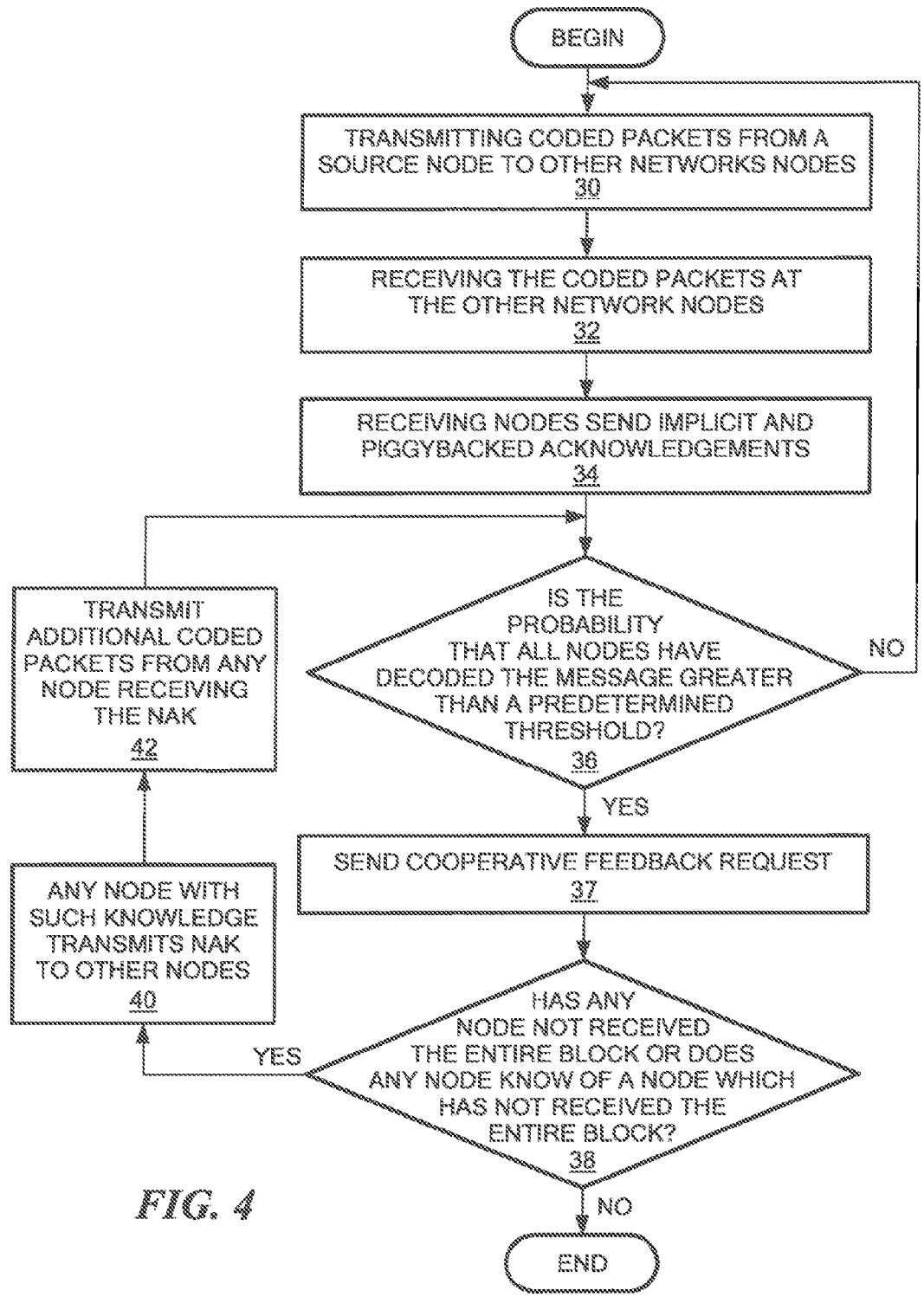
FIG. 4 is a flow diagram illustrating a method for reducing the amount of traffic in a network utilizing cooperative feedback requests.

It should be understood that the concepts, systems and techniques described herein are useful in any type of network and may be particularly useful in any network in which efficiency is important (efficiency being important, for example, in networks having limited bandwidth). Also, it should be appreciated that the concepts, systems and techniques described herein apply equally well to single hop and multi-hop systems.

Referring now to FIGS. 1-3, a network 10 includes a plurality of stations or nodes 12a-12e generally denoted 12. Nodes 12 can be coupled as shown through channels or links 13a-13h generally denoted 13. All or portions of network 10 may comprise WiFi, cellular, satellite technology.

In operation, source node 12a transmits information to one or more other nodes 12b-12i in network 10, wherein the information is in the form of a plurality of coded packets. If each of the nodes is a destination node (i.e. a node to which the source node intended to send the information), then transmission of coded packets continues until each destination node receives a number of coded packets sufficient to decode the message.

In some cases the information transmitted by the source node 12a may be intended only for a single node and in such a case, it is not necessary that all nodes 12 receive a number of coded packets sufficient to decode the message. Rather it is only necessary that the single destination node receive a number of coded packets sufficient to decode the message from the source node 12a. Network 10 utilizes network coding in conjunction with probabilistic reception models to determine when to cease transmitting coded packets, when to request feedback, when to send feedback messages, and when to send additional coded packets in response to feedback. By utilizing network coding in conjunction with probabilistic reception models, the system is able to reduce the number of data transmissions and feedback requests to different nodes, as well as the number of feedback messages. These reductions result in a decrease in the amount of traffic in the network, and consequently results in an increase it the amount of throughput and a decrease in delivery time in the network.

Each of the nodes 12 in network 10 "knows" (i.e. has information stored therein or has access to information or can compute information) the location of some or all other nodes and each node includes a statistical, model for channel losses to all other nodes (any of the well-known models or even models yet to be developed may be used). Each of the nodes 12 also knows what it transmitted and what it received. Utilizing some or all of the aforementioned information, the number of messages which are transmitted in the network 10, including but not limited to acknowledgement messages (ACK) messages or more simple ACKs and negative acknowledgement messages (NAK) messages or more simply NAKs may be reduced compared with the number of messages sent in a conventional network.

First, nodes transmit coded packets. Then as in FIG. 2, a cooperative feedback request (or an "auction message") is sent out by a node (in this example node 12e) that has determined that with high probability all nodes have received a sufficient number of coded packets to decode the source node's (in this example node 12a) message.

One example mode of operation is shown in FIG. 1. (We note that other modes of operation could use NAKs instead of ACKs.) Node 12a acts as a source node and transmits a coded packet 14, or a sufficient number of coded packets to decode message 14', to each of the nodes in the network (i.e. nodes 12a-12i in the exemplary embodiment of FIG. 1). When nodes 12d receives coded packet 14, or a sufficient number of coded packets to decode message 14', node 12d utilizes a channel model contained therein to predict the probability that nodes 12e-12i receive coded packet 14 or a sufficient number of coded packets to decode message 14'. If node 12d determines, based upon the channel model, that coded packet 14 or a sufficient number of coded packets to decode message 14'; was also received at nodes 12e-12i, then node 12d sends an ACK message for itself as well as for nodes 12e-12i. Thus, nodes 12e-12i do not send separate ACK messages. This approach reduces the number of ACK messages being transmitted in the network and thus the amount of network traffic is reduced.

Similarly, if node 12d (or any other node) determines, based upon the channel model, that coded packet 14 or a sufficient number of coded packets to decode message 14' was not received at one or all of nodes 12e-12i, then node 12d may send a NAK message for nodes 12e-12i. Thus, nodes 12e-12i do not send separate NAK messages. This approach reduces the number of NAK messages being transmitted in the network and thus the amount of network traffic is reduced. It should be appreciated that node 12d may or may not have successfully received packet 14 or a sufficient number of coded packets to decode message 14'. That is, even if node 12d successfully receives packet 14 or a sufficient number of coded packets to decode message 14', it may be possible that node 12d received packet 14 or a sufficient number of coded packets to decode message 14' in such conditions that based upon channel models or other information either stored in the node or which the node can access, node 12d is able to conclude that nodes 12e-12i could not have or did not likely have successfully received the message 14'. In this case node 12d would send an ACK for itself and would send a NAK for nodes 12d-12i. In many cases, only the NAK for nodes 12d-12i would be of use to other nodes; in these situations node 12d may not need to send an ACK for itself.

It should be understood that there may be a number of means by which nodes learn how many coded packets other nodes are missing. For example, re-encoded packets transmitted from a relay node implicitly can inform what that node needs. Also, ACK or NAK messages can be piggybacked onto periodic location updates or other control messages. Also, ACK or NAK messages can be piggybacked onto new (or re-encoded "relayed") traffic transmitted from a node. Also, some or all nodes may have a probabilistic channel model for how many coded packets other nodes have received, for each message transmitted by any node. The inputs to this model are updated with reception of each message including, but not limited to each of the above-noted message types.

As illustrated in FIG. 2, when a particular node which is not the source node (e.g. node 12e) has enough information (or knowledge) stored therein and the information indicates with a desired level of probability that all other nodes (e.g. nodes 12a-12d and nodes 12f-12i) with a need to decode a message have sufficient is to decode the message, then that particular node can send a cooperative feedback request (also sometimes referred to herein as an "auction message"). Those of ordinary skill in the art will understand the factors to consider in determining a desired level of probability for any particular application. Such a determination may include both analytically determined factors as well as empirically determined factors. In general, a trade-off must be made between a degree of probability and a number of transmissions.

As shown in FIG. 2, node 12e broadcasts the cooperative feedback request 18 (shown in the exemplary embodiment of FIG. 2 as an auction message 18) to the network. By sending cooperative feedback request 18, node 12e indicates that the information it has stored therein (or which is computed therein or which is otherwise available to the node 12e) indicates that node 12e believes with a desired degree of probability that all other nodes have received enough coded packets from source 12a and other relay nodes in 12 to decode the message from source 12a.

It should be appreciated that in the exemplary embodiment of FIG. 2, node 12e sends the cooperative feedback request to nodes 12b-12d as well as to nodes 12f-12i (i.e. node 12e broadcasts auction message 18 to network 10). In other embodiments, it may be desirable for node 12e to send the cooperative feedback 18 request to less than all of the nodes in the network.

Although in the exemplary embodiment of FIG. 2, node 12e is the node which transmits the cooperative feedback request 18, it should be appreciated that any node in the network with sufficient knowledge may transmit the cooperative feedback request to the other nodes including any and all destination nodes. This approach relieves from the source node (illustrated as node 12a in the exemplary embodiment of FIG. 2) of the burden of providing all feedback and all feedback requests. Thus, the node which provides the cooperative feedback request can be any node in the network with sufficient knowledge that all other nodes at which the message should be decoded have enough information to decode the message (e.g. that each destination node has enough information to decode the message) with high probability.

Thus, in network 10, a node 12 other than source node 12a can make the determination as to whether it is necessary to transit or re-transmit any additional packets in the network.

It should also be appreciated that in the case where source node 12a broadcasts a message to the network 10, each of nodes 12b-12i corresponds to a destination node for that message. Thus, in this case the node or nodes which transmit the cooperative feedback requests can be any node in the network with sufficient knowledge that all other nodes with high probability have sufficient information to decode the message (i.e. that each destination node has enough information to decode the message).

It should also be appreciated that even if node 12e sends cooperative feedback request 18, if node 12g receives packet 14 and concludes that based upon channel models or other information, either or both of nodes 12h, 12i could not have successfully received the packet, then node 12g may send a NAK message for nodes 12h and/or 12i.

Referring now to FIG. 3, source node 12a sends a packet (not shown in FIG. 3). The packet is successfully received at nodes 12b-12g. Node 12h in network 10 sends (e.g., broadcasts) a NAK message 20 for itself and another node (i.e. node 12i). Node 12g receives the NAK from node 12h. Since node 12g knows that it successfully received packet, in response to receiving NAK message 22, node 12g performs a cooperative re-transmit operation in which node 12g transmits new re-encoded packets 22. In the exemplary embodiment of FIG. 3, node 12g broadcasts the re-encoded packets 22. Nodes 12h, 12i use re-encoded packets 22 to decode a message.

It should be appreciated that in conventional systems, if the acknowledgements were end-to-end, as in TCP, source node 12a would re-send the packet(s) not received by nodes 12h, 12i.

It should also be appreciated that a node would send a NAK for another node either if that node itself did not receive enough coded packets or if the information stored or computed or otherwise existing in the node (or the node's knowledge) indicates that another, perhaps more disadvantaged (e.g. a node more distant from a source), node did not successfully receive enough coded packets. Thus, stated more simply, a node 12 sends a NAK if the node itself did not receive enough coded packets or if the node has knowledge with a desired degree of probability that another node did not receive enough coded packets.

It should be appreciated that the exemplary embodiments described above in conjunction with FIGS. 1-3 may represent a wireless network having packet losses and in which nodes in the network can overhear and store information that they receive and wherein random linear network coding is used by intermediate relay nodes to combine packets they receive from other nodes, before repromulgating the received information. In such a system, a method of transmitting information from a source node to one or more destination nodes comprises transmitting a random linear combination, of coded packets. All nodes within reception range of relay nodes may receive implicit acknowledgments as to how many degrees of freedom the relay nodes have already received. Based upon the degrees of freedom, the transmission of new linear combinations of coded packets may continue, wherein the number of degrees of freedom received by other nodes, or from blocks from other flows of which the relay node has knowledge are piggybacked on the new random linear combinations.

In one embodiment, new traffic originating at any node piggybacks information pertaining to the degrees of freedom received from other blocks from other flows. It should be appreciated that the nodes in the network have a priori knowledge of the probability that a packet transmitted from a specified node can be correctly received by another specified node. Such a priori knowledge can come from location information that the nodes receive about each other, as well as from a channel model.

FIG. 4 is a flow diagram showing the processing performed by or on behalf of a network node which may, tier example, be provided as part of a network such as one of the networks shown in FIGS. 1-3, 6 and 6A. In particular, the flow diagram illustrates a method of transmitting information from a source node to one or more other nodes in a network. The network is comprised of a plurality of nodes and the information being transmitted is in the form of a plurality of coded packets.

The rectangular elements (e.g. block 30 in FIG. 4) in the flow diagram are herein denoted "processing blocks" and represent steps or instructions or groups of instructions. Some of the processing blocks can represent an empirical procedure or a database while others can represent computer software instructions or groups of instructions. Some of the steps described in the flow diagram may be implemented via computer software while others may be implemented in a different manner.

Alternatively, some of the processing blocks can represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to perform the steps or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the concepts, systems and techniques described herein.

Turning now to FIG. 4, processing begins in processing block 30 in which a source node transmits a message in the form of coded packets to one or more other nodes in a network as is generally known. One or more of the other nodes correspond to a destination node (i.e. a node which the source node intends to receive the message). Thus, in the case of a broadcast message all other nodes in the network correspond to destination nodes.

Processing then proceeds to processing block 32 in which the one or more other nodes receive a number of coded packets. It should be appreciated that the destination node(s) should receive a number of coded packets sufficient to decode the message.

Processing proceeds to block 34, whereby nodes transmit explicit and implicit acknowledgements.

Processing then proceeds to processing block 36 in which a node determines whether it can send a cooperative feedback request (a/k/a an auction message) for at least one other node in the network. In preferred embodiments, each node in the network determines whether it can send a cooperative feedback request.

As shown in processing block 36, the manner in which the node determines whether it can send a cooperative feedback request includes the node processing or otherwise using a plurality of different types of information which the node has stored therein or to which the node otherwise has access. To determine whether a node can send a cooperative feedback request, it is necessary for the node to determine whether another node has or has not received the coded packets transmitted by the source node. The node can accomplish this, for example, by using: (a) information which has been overheard or directly transmitted from other nodes; (b) node location information; (c) probabilistic channel model knowledge; (d) a combination of any (including all) of the above types of information (e.g. a combination of information overheard from other nodes and/or node location information and/or information from a probability model for a channel).

As shown in processing block 37, once a node determines that it can send a cooperative feedback request (i.e. once a node determines that it can send an auction message for one or more other nodes), then it does so. In a preferred embodiment, the node sends the cooperative feedback request to each other node in the network (i.e. the node broadcasts the cooperative feedback request). Node processing to determine whether to send a cooperative feedback request then ends. As discussed above in conjunction with FIGS. 1-3, once a cooperative feedback request is sent, nodes receiving the cooperative feedback request may then perform additional processing (e.g. transmission of new coded packets or re-transmission of coded packets).

Each node that receives the cooperative feedback request will determine through the explicit and implicit knowledge it is accumulated about itself and its neighbors, in block 38, if it should respond to that feedback request. As shown in block 40, each such responding node transmits a NAK.

It should be appreciated that an ACK or a NAK is only sent when one or more nodes have sufficient knowledge to determine if other nodes have received a sufficient number of coded packets to decode the message in one exemplary embodiment, in response to a non-source node receiving a NAK, the node transmits coded packets, as in block 42 to other nodes (in accordance with the concepts, systems and techniques described herein, the retransmitting node need not be the source node nor the last hop node that originally transmitted coded packets to the nodes in need of more. In one exemplary embodiment, in response to a non-source node receiving a NAK, the non-source node transmits newly coded packets to other nodes.

In one embodiment, in a network comprising a plurality of nodes, a decision is made as to which node should transmit newly coded packets. In one embodiment, this decision is made using node locations to determine which node should transmit newly coded packets.

Figure 5:
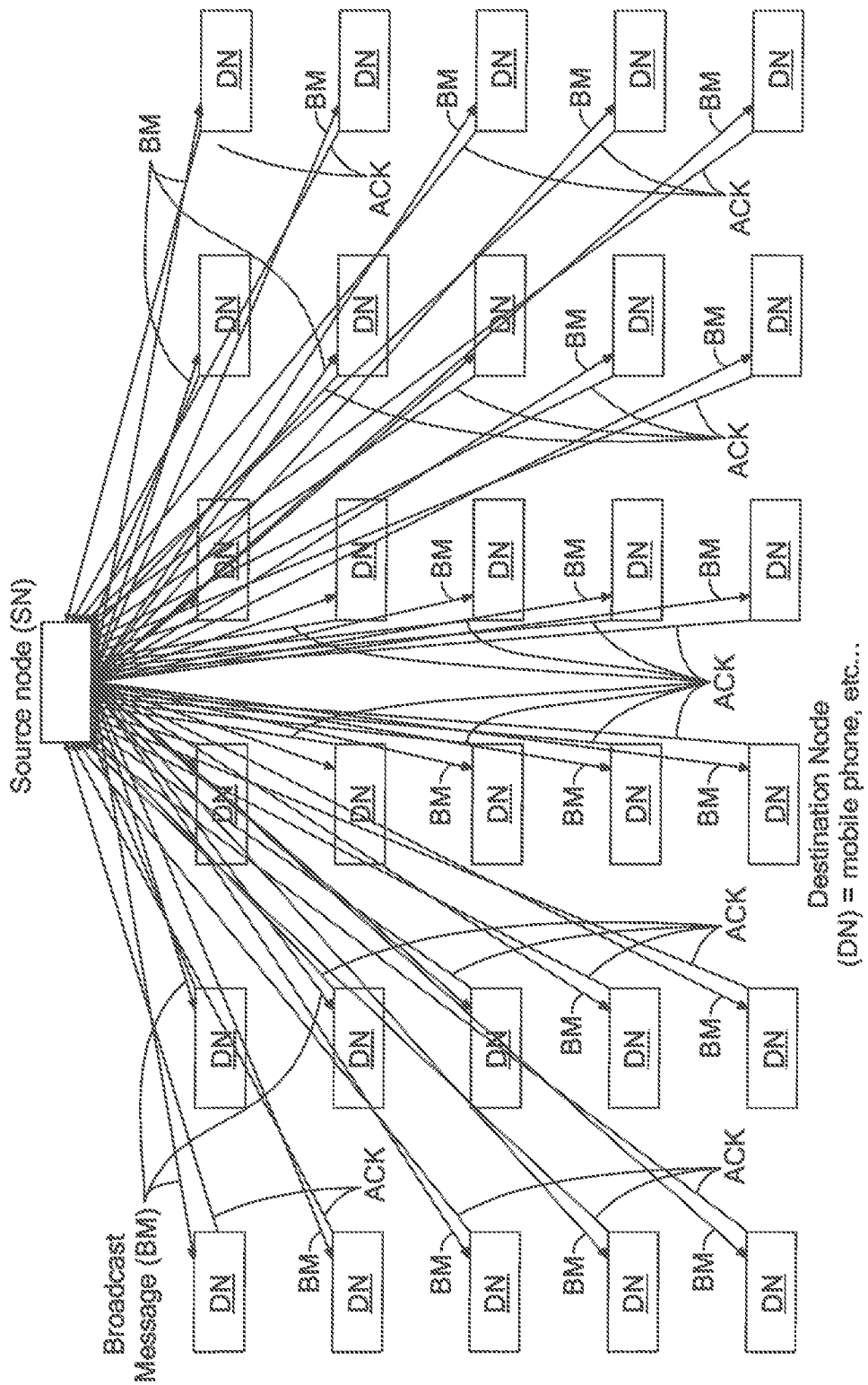
FIG. 5 is a block diagrams illustrating a prior art network experiencing an ACK explosion.

Referring now to FIG. 5 a prior art system includes a source node SN which broadcasts a message BM to a plurality of destination nodes (DN). The nodes shown in FIG. 5 may, for example, correspond to people with smart phones. Each destination node sends an acknowledgement packet (ACK) to source SN which results in source node SN experiencing an ACK explosion.

Figure 6:
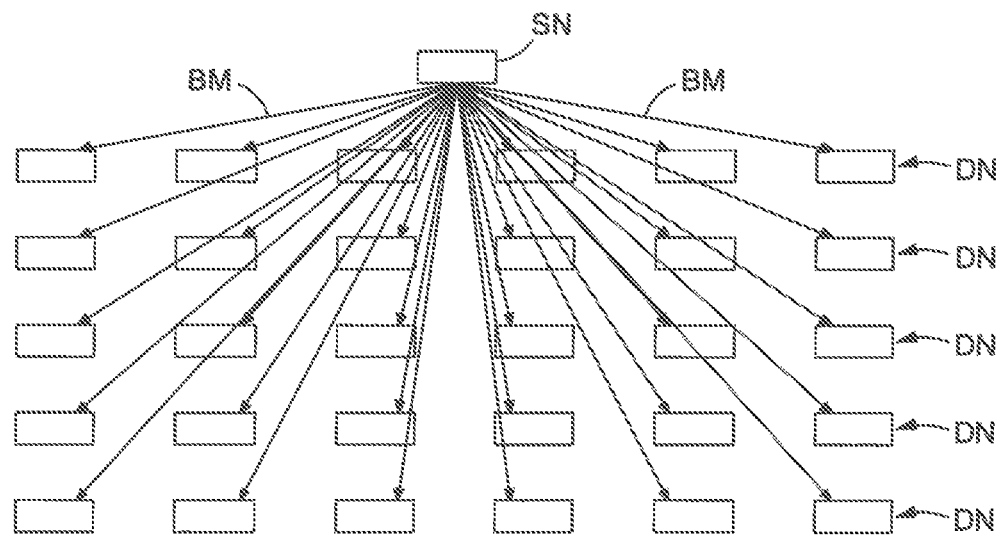
FIGS. 6 and 6A are a series of block diagrams illustrating a network which avoids an ACK explosion by using cooperative feedback requests.
Figure 6A:
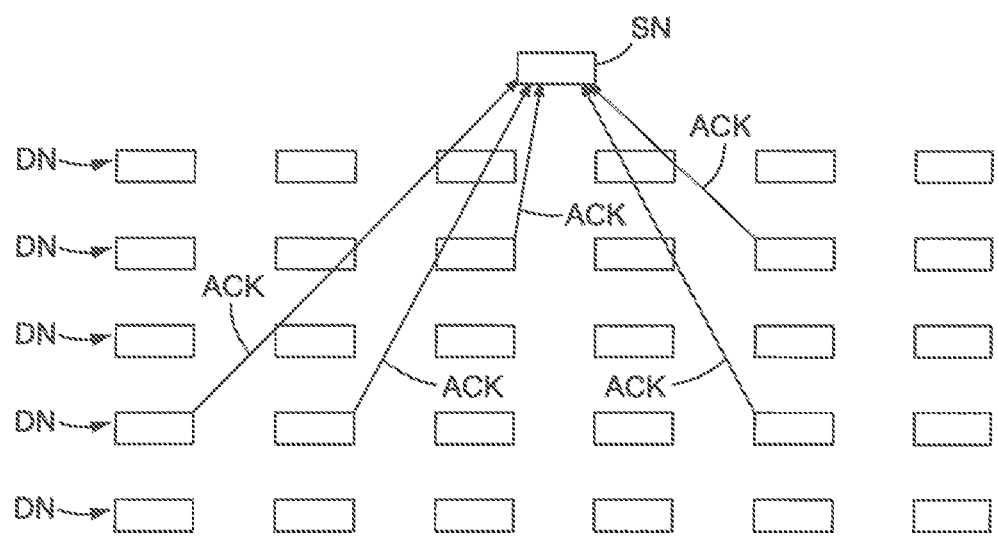

FIGS. 6 and 6A are a series of block diagrams illustrating a network which avoids an ACK explosion by using cooperative feedback requests. As Shown in FIG. 6, source node SN again broadcasts a message BM to a plurality of destination nodes (DN).

As Shown in FIG. 6A, however, using the techniques described herein, some nodes ACK (or NAK) for other nodes. Thus, not every node needs to send an appropriate one of an ACK or NAK. Consequently, the number of ACK/NAK packets transmitted to source node SN is greatly reduced compared with the system of FIG. 5.

In a network having a source node and a plurality of destination nodes (such as the exemplary network such in FIGS. 6 and 6A), a method for transmitting and acknowledging a broadcast message includes for M information packets, generating linear coded packets and transmitting from the source node, the linear coded packets to the destination nodes. Upon reception of the $N_M$ linear coded packets at one or more of the destination nodes, determining whether one of the destination nodes can send one of an ACK or a NAK for at least one other destination node.

Determining whether one of the destination nodes can send one of an ACK or a NAK for at least one other destination node can be accomplished as discussed above (e.g. using information which has been overheard from other nodes; implicitly transmitted by other nodes, piggybacked by other nodes, using node location information; and using probabilistic Channel model knowledge in each of the nodes including using a probability channel model; and/or a combination of the above and other techniques).

Next explored is the spatial dependence of the probability of message loss. The capture effect makes it more likely that nodes close to a transmitter will receive a message than nodes farther away. In order to illustrate this spatial dependence, a 200 node linear network is considered.

Figure 7:
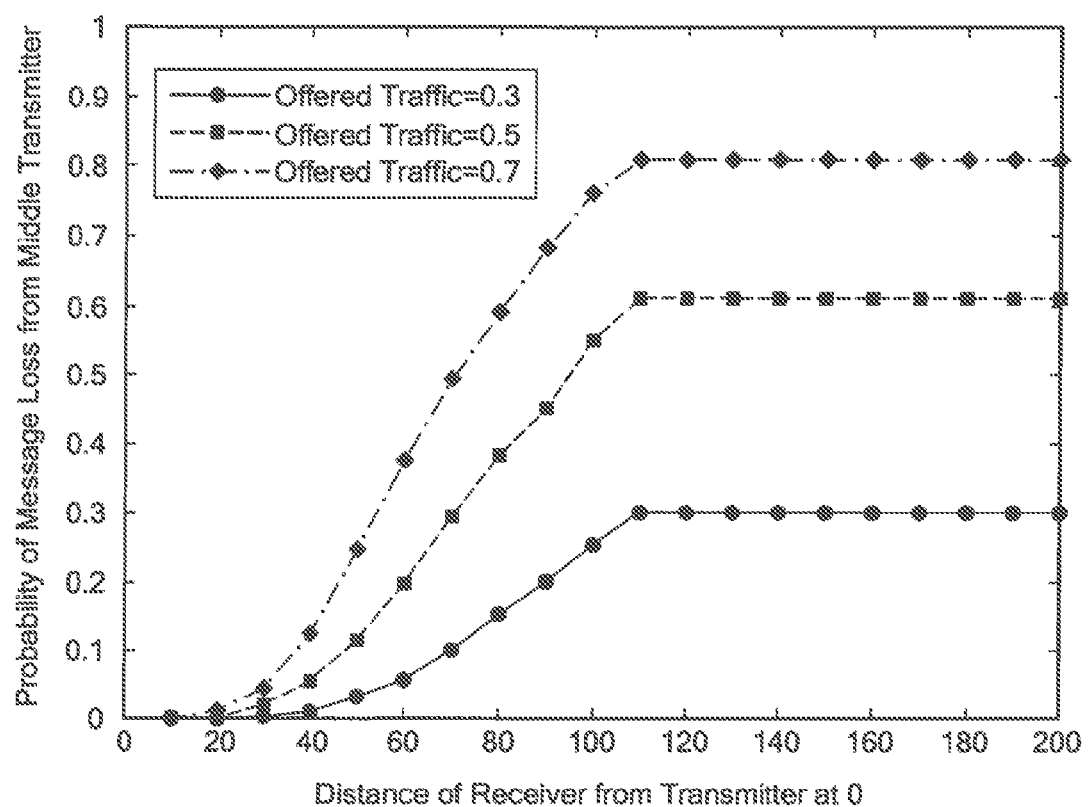
FIG. 7 is a plot of message loss vs. distance from the transmitting node for a total offered information traffic of 0.3.

FIG. 7 shows the probability that a message transmitted by the left most node will be lost by each of the receiving nodes for several values of total offered information traffic, when successive coded packet transmission probability Pt=0.07. As shown in FIG. 12, there is a saturation point at node 100 beyond which all future nodes are impacted by the same amount of interference. Loss of coded packets occurs when another node closer to the receiver transmits in the same time slot as another node sending a message, so receivers farther away from the transmitter will be subject to more interference, and therefore will experience a higher likelihood of message loss. The saturation occurs due to edge effects, because the nodes in the saturated region are subject to potential interference from every other node in the network.

The spatial dependence of probability of message loss is seen to result from the combination of capture and edge effects. A similar profile is seen if mean delay is plotted as a function of distance from the transmitting node. More traffic leads to a higher mean delay, as expected. Mean delay increases rapidly with distance from the transmitting node until the plateau point is reached at which point the mean delay stays constant at longer distances due to edge effects.

Figure 8:
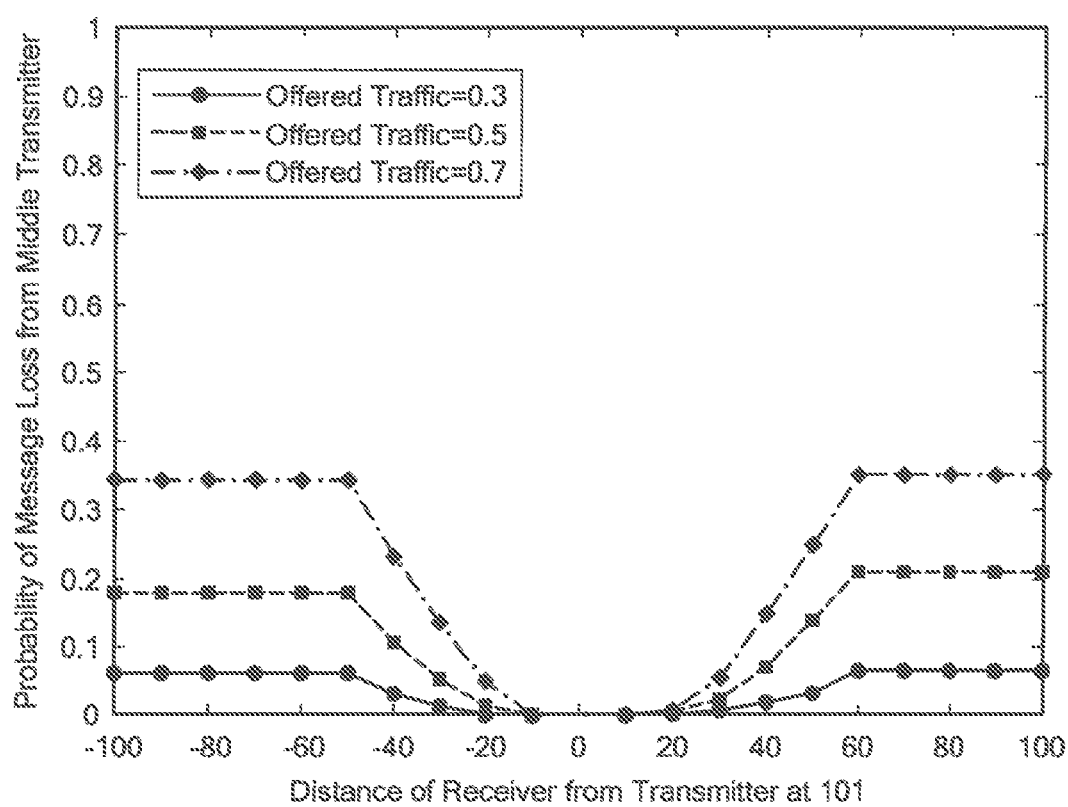
FIG. 8 is a plot, of percent of message loss vs. distance from transmitter at total offered information traffic of 0.3.

Next considered in conjunction with FIG. 8 are packet receptions from transmissions made by the middle node.

FIG. 8 shows the probability of losing a message that is sent from the central transmitter. FIG. 8 shows the expected mirrored loss as the distance from the transmitting node is increased in either direction.

Next considered is the concept of utilizing the spatial dependence of packet loss that is induced by the combination of the capture effect and edge effects. Since in the model used here, with capture and collisions being the only source of packet loss, it is seen from FIG. 12 that if any of the nodes between nodes 100 and 200 received the message, then they all received it. In this case, the reception by the plateau point node, which is node 100 for example when the transmitting node is the left most node, deterministically implies that the nodes on the other side of the plateau point have received the packet with certainty. Therefore, the following feedback protocol is implemented when coding and random spreading of coded packets in time is used when the receiver at the designated plateau point for each transmitter receives the message (that is any k coded packets), it sends an acknowledgement to the transmitting node; the plateau point identifies the closest receiving node that will be impacted by every other potential interfering node; when this node has received the message, it can be assumed that every other node has as well. By enabling this feedback, one is able to reduce the overall traffic in the system and therefore reduce collisions and loss, as well as delay, of future messages.

Next described is a technique to determine the plateau point node for a transmitting node. For example, if a transmitting node located at t<N/2 nodes from the left most node, where N is the total number of nodes in a linear network, the two potential plateau points would be located at transmitters P1 and P2:

$$P1 = (N-t)/2) \div t \qquad \text{Equation (4)}$$

$$P2 = t/2 \qquad \text{Equation (5)}$$

In this case N is the number of nodes in the system and P is the plateau point index. Note: when the middle node is the transmitter there are two pivots, defined by each of the equations above, that both must acknowledge message receipt for feedback to be successful.

Figure 9:
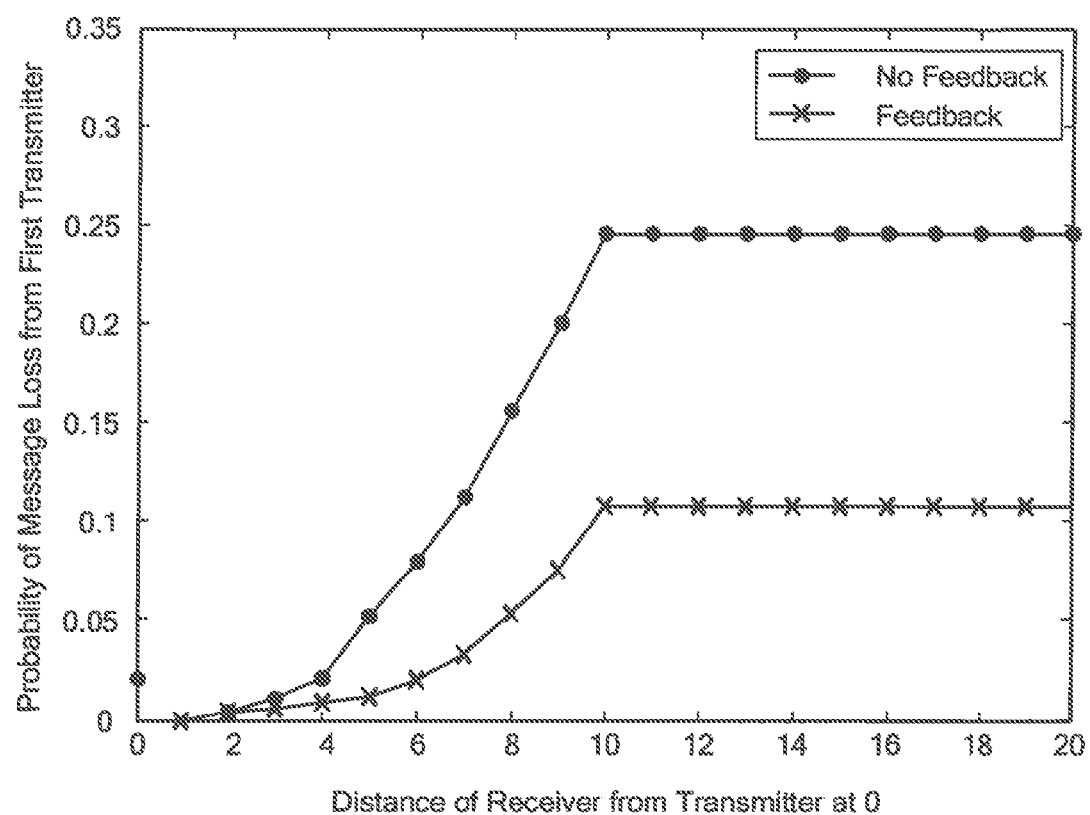
FIG. 9 is a plot of feedback to the transmitter at 0 for a twenty one (21) node network.

FIG. 9 shows the resulting decrease in message loss from this protocol for N=21; k=3=number of original source packets in a message; n=6=maximum number of coded packets that will be transmitted for a single message, and Pt=0.07, for an offered traffic of 0.3. The upper curve represents no feedback when all n packets are transmitted, whereas the lower curve shows the performance with the feedback protocol.

The difference between the two caves Shows the significant reduction in loss provided by the feedback protocol. The savings from the feedback is greatest where the loss is greatest, which is beyond the plateau point. Here, the message loss is reduced by more than a factor of 2.

Again, for the half of the nodes beyond the plateau point, the message loss is reduced by a factor greater than 2. The absolute value of the decrease in probability of message loss is only a few percent here, whereas it was 15% when the edge node transmitted, because the absolute value of the original message loss probability is smaller when the middle node transmits. Hence, when averaging over all transmitting and receiving nodes, the absolute value of the probability of message loss decreases a few percent when the feedback protocol is used. The savings from using the feedback protocol are greatest for the receiving nodes most distant from the transmitting node.

Figure 10:
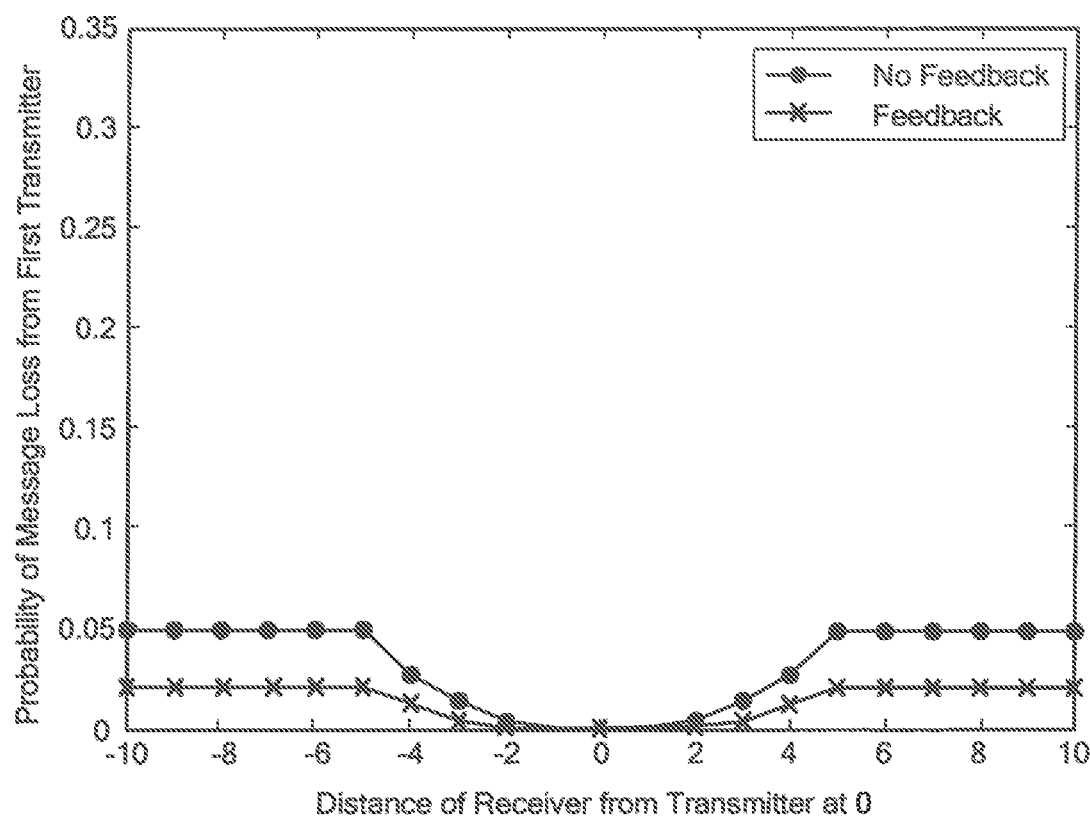
FIG. 10 is a plot of feedback to the transmitter in the middle for a twenty one (21) node network.

FIG. 10 shows the impact of feedback on message loss across the linear network for messages transmitted from the center node, when the same system parameters are used. Feedback is again seen to significantly decrease message loss by a factor greater than 2 relative to loss without feedback, particularly for the half the nodes in the network that are most distant from the center node. We note that similar results for both the edge and center nodes transmitting are obtained for a 200 node linear network.

It should be noted that while some communication system, such as Link 16, exhibit nearly perfect capture, others may have an imperfect capture. More generally, if there is partial capture, then the plateau points move in towards the transmitter, while the probability of message loss increases at these plateau points. In the limit of no capture, the probability of message loss is greatest, and the nodes adjacent to the transmitter experience the same loss as all the other nodes in the network, and feedback from them would indicate the reception status of all nodes in a pure collision channel.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. In a wireless network having packet losses and comprising a plurality of nodes, the plurality of nodes comprising a source node and two or more other nodes including at least one intermediate relay node and at least one destination node, in which the plurality of nodes can overhear and store information that they receive with a sufficiently high signal to noise plus interference ratio and wherein random linear network coding is used by the at least one intermediate relay node to combine packets that the at least one intermediate relay node receives from other nodes, before repromulgating the received information, a method comprising:

transmitting a random linear combination of coded packets from the source node to the other nodes in the network;

at all nodes within reception range of the at least one intermediate relay node, determining with a desired degree of probability how many degrees of freedom the at least one intermediate relay node has received based upon one or more of information which has been overheard or directly transmitted from other nodes, node location information or a probabilistic channel model;

based upon the determined degrees of freedom, transmitting a new random linear combination of coded packets from one or more nodes within reception range of the at least one intermediate node to one or more of the other nodes in the network, wherein number of degrees of freedom received by the other nodes, or from blocks from other flows of which the at least intermediate relay node has knowledge are piggybacked on the new random linear combination of coded packets.

2. The method of claim 1 wherein new traffic originating at any node piggybacks information pertaining to the degrees of freedom received from other blocks from other flows.

3. The method of claim 2 wherein the nodes in the network have a priori knowledge of the probability that a packet transmitted from a specified node can be correctly received by another specified node.

4. The method of claim 3 wherein such a priori knowledge comes from location information that the nodes receive about each other as well as from the probabilistic channel model.

5. The method of claim 1 wherein transmitting a new linear combination of coded packets further comprises:

transmitting the new linear combination of coded packets further in response to number of degrees of freedom missing at the at least one destination node.

* * * * *